United States Patent Office 2,833,030
Patented May 6, 1958

2,833,030

METHOD OF JOINING METAL PARTS WITH FLEXIBLE COMPOSITE JOINING MATERIAL

Robert L. Peaslee, Royal Oak, Mich., assignor to Wall Colmonoy Corporation, Detroit, Mich., a corporation of New York No Drawing. Application September 19, 1952
Serial No. 310,539

2 Claims. (Cl. 29—496)

The present invention relates to a joining alloy composition suitable for use in joining metallic parts by brazing, soldering, welding, and the like. More particularly this invention concerns a composite material containing a fusible metal or alloy in powdered or granular form which is bonded by a resinous material into a flexible strip, sheet or other molded or extruded shape.

Heretofore, processes for joining metallic parts have employed suitable low melting point metals or alloys in the form of a casting or as powder. In quantity production, it is usually desirable to pre-position the joining material at the prepared joint so as to enable the simultaneous application of heat to large batches of articles as in furnaces or in continuous line production employing, for example, high frequency induction heating apparatus. Many alloys commonly used in joining processes such as brazing, soldering, welding, etc. are not sufficiently ductile to permit forming into the desired shapes by conventional methods such as rolling, forging, etc. Furthermore, in the conventional joining of many metals, such, for example, as iron, it is necessary to protect the surfaces to be joined from undesirable oxidation at elevated temperatures, and this is conventionally accomplished by separately applying a variety of fluxes, atmosphere producing agents, etc.

It is, therefore, the principal object of the present invention to provide a metallic joining material in a form suitable for pre-positioning at the desired juncture between a wide variety of metallic parts of varying shapes and sizes.

Another object is the provision of a metallic joining material in combination with a thermoplastic binder which is capable of being preliminarily shaped to fit the line of juncture of the parts to be joined and which maintains the joining material in proper position as the temperature is raised and until the joining of the parts is accomplished.

A further object of this invention is to provide a composite joining material in the form of a flexible strip, sheet or molded or extruded shape which enables the preliminary disposition of the requisite quantity of joining metal at the line of juncture of the parts to be joined.

A still further object is the provision of a joining material in the form of a flexible, deformable sheet, strip or the like containing supplementary ingredients capable of producing special desired effects during the joining operation, such as oxidation protective fluxes, cleaning agents, atmosphere producing agents and the like.

Yet another object is to provide a flexible composite joining material for metallic parts which utilizes a resinous binder, which upon heating to a temperature below the melting point of the joining material substantially completely volatilizes without forming undesirable carbonaceous deposits or otherwise detrimentally affecting the strength of the joint.

Other objects and advantageous features of the invention will be specifically pointed out or will become apparent when the disclosure is considered in its entirety.

In accordance with this invention, it has been found that the above and related objects may be accomplished by providing a binder or carrier for finely divided joining metal which will enable the fabrication or forming of the joining metal into the shape required for positioning at the juncture between the metal parts to be joined preliminary to the actual joining.

Joining metals which are suitable for use together with a suitable binder, include substantially all of the diverse joining metals and alloys which are conventionally employed in soldering, brazing and welding operations on a wide variety of metals and metallic parts. Such joining metals or alloys may range from soft solders having a melting point as low as about 360° F. to high melting point brazing alloys for stainless steels melting in the range of about 1900° F. to about 2400° F. Mention may also be made of other commercially used types of joining metals which have melting points that are intermediate the melting point of solders and stainless steel alloys such as, e. g., the silver base brazing alloys having melting points varying between about 1100° F. to about 1400° F., copper base brazing alloys melting between about 1500° F. and 1900° F., aluminum base brazing alloys melting between about 1000° F. and 1200° F., lead base alloys melting between about 360° F. and about 620° F., as well as the metals silver, copper, iron, lead, tin, zinc, etc. Any joining metal which presents difficulty in fabricating to a shape or form suitable for pre-positioning at the joint between the parts to be united, may be utilized in the composition of this invention and the benefits which inure from providing the proper quantity of joining metal at the desired point will be realized.

The joining metal used is preferably in finely divided form to facilitate the admixture with and the uniform distribution in the selected binder. It is not necessary that the joining metal be powdered to particles all of which will go through a 200 mesh/inch screen, but difficulty is experienced when the individual metallic particles are allowed to exceed the size which are retained on a 65 mesh/inch screen. In general, metallic particles which will pass through a 60 mesh/inch screen are satisfactory. Particles which will pass through a 100 mesh/inch screen are preferred, but of course mixtures of various particle sizes are usually encountered and are usable where the average particle size approximates 60 mesh/inch or smaller sizes.

Binders which may be employed together with any of the above joining metals or alloys should possess the properties of flexibility after molding, complete volatility upon heating, freedom from the deposition of carbonaceous or joint-strength-reducing minerals, and freedom from the liberation of oxidizing gases upon heating. For most applications, a relatively low melting point and boiling point material is additionally desirable. The binder should also be readily formed by molding or extrusion into any desired shape. Broadly, thermoplastic resins fulfill these requirements and may be used for the purposes of this invention.

In the joining operation, it is, of course, necessary to heat the joining metal and the parts to be joined to a temperature sufficient to cause the melting of the joining material and its union with the surfaces being joined. Most metals are subject to oxidation upon heating in air, and it is necessary to protect the joint from oxygen as well as other gases or impurities which are reactive with the metal surface in order to form a soldered, brazed or welded joint which is sound and strong. It is, therefore, necessary to avoid the use of certain thermoplastic copolymers which, upon heating, liberate undesirable oxidizing gases. These materials include copolymers of halogen-substituted vinyl monomers such as vinyl chloride, vinylidene chloride, etc. Nitrogen containing thermoplastic resins such as cellulose nitrate and the polyamides may be used but are less desirable than the polymers of carbon-hydrogen compounds, such, for example, as polyethylene, polystyrene, cellulose acetate, cellulose acetate butyrate, ethyl cellulose, polymerized acrylics and methacrylics and polymerized vinyls. Of the various types of thermoplastic resins, the polyethylenes are preferred.

The operative proportions of joining metal or alloy and binder may vary over rather wide ranges depending upon the requirements of the particular application. A satisfactory formulation may contain about 5% to about 50% thermoplastic binder and 50% to 95% joining metal or alloy by weight. For most applications, a proportion of binder between about 10% and 20% by weight of the composition is adequate with the joining metal forming the balance.

The joining composition is formed by admixing the desired quantity of the selected joining material and polymeric binder, each being in relatively finely divided form, in conventional mixing apparatus such as a Muller mixer, rotary mixer or the like, in a short period of time such as 5 to 30 minutes. After the ingredients are uniformly admixed, the resultant mixture is molded or extruded by techniques conventional for thermoplastic molding compositions into the form desired. The form of the composition after molding or extrusion is widely variant and may assume the form of a strip, sheet, rod, wire or the like. The molding or extrusion should be conducted at a temperature and for a time sufficient to convert the binder to a flexible state which is not sticky or tacky. Rigidity in the polymerized material is not desirable however, because of the reduction in utility in positioning in non-symmetrical joints, for example. The preferred form of the composition for utility and breadth of application, is flexible wire or relatively long filaments having diameters up to about 3/8".

In using the composition of this invention for brazing, for example, a ferrous stud into a ferrous base member having a blind cavity for receiving the stud with a silver base brazing alloy, the two parts are prepared for joining in the conventional manner. The surfaces to be joined are either chemically cleaned, grit blasted or the like, and surfaces generously fluxed. The joining material, in the form of a strip, containing 15% by weight polyethylene and 85% silver base brazing alloy melting at about 1275° F., is pre-cut to the proper length to contain the necessary quantity of brazing alloy to form a strong joint. The joining material is placed around the stud adjacent to the cavity and, if necessary, is maintained in place by a small amount of an adhesive suitable for polyethylene resins and the assembly is again fluxed. Upon heating, the polyethylene decomposes and completely volatilizes before the melting point of the brazing alloy is attained, and deposits the brazing material at the line of juncture. The heating is continued until the silver base brazing alloy melts and unites the stud and the base.

The following examples illustrate the composition and method of the invention in greater detail. All percentages are by weight.

*Example 1*

| | Percent |
|---|---|
| Polyethylene* | 15 |
| Joining alloy: | |
| 73% Nickel | |
| 15% Chromium | |
| 3½% Boron | |
| 4% Silicon | 85 |
| 4% Iron | |
| 1% Cobalt, maximum | |

* "Alathon," E. I. du Pont

The polyethylene and joining alloy, in finely divided form, were uniformly mixed in a rotary mixer in 15 minutes. A portion of the mixture was placed in a conventional injection molding machine and molded at about 350° F. into strips ½" wide, 1/16" thick and 18" long. Another portion was extruded into rod or wire having diameters of 1/16", 1/8" and ¼". Still another portion was compression molded into annular disks.

Using the method of compounding and of forming into shapes as set forth in Example 1, other typical compositions are given below.

*Example 2*

| | Percent |
|---|---|
| Polystyrene | 20 |
| Joining alloy*: Silver, zinc, cadmium, nickel | 80 |

* Easy-Flo #3

*Example 3*

| | Percent |
|---|---|
| Cellulose acetate | 10 |
| Soft solder (40% lead, 60% tin) | 90 |

*Example 4*

| | Percent |
|---|---|
| Polyethylene | 18 |
| Alloy: Aluminum+silicon, melting point 1100° F | 75 |

*Example 5*

| | Percent |
|---|---|
| Cellulose acetate butyrate | 18 |
| Silver-copper alloy, melting point 1380° F | 82 |

If desired, the composition of this invention as typified by the above examples may additionally include other ingredients to produce special desired effects during the joining operation, such as oxidation protective fluxes, cleaning agents, and non-oxidizing gas liberating agents whose specific compositions are well known to those skilled in the art.

What is claimed is:

1. The method of joining metallic parts which comprises the steps of positioning a flexible joining material in the form of an elongated filament at the line of juncture between the parts to be joined to form an assembly, said joining material consisting essentially of 5%–50% of a polymerized carbon-hydrogen polymeric material which volatilizes upon the application of heat without releasing carbon and oxidizing gases and 50%–95% of finely divided particles of flowable metallic joining material uniformly distributed therethrough, and applying heat to the said joining material to first vaporize the said binder and to thereafter liquify the said metallic particles to thereby join the said metallic parts.

2. The method of joining metallic parts which comprises the steps of positioning a flexible joining material in the form of an elongated filament at the line of juncture between the parts to be joined to form an assembly, said joining material consisting essentially of 5%–50% of a polymerized carbon-hydrogen polymeric material which completely volatilizes upon the application of heat without releasing carbon and oxidizing gases and 50% to 95% of finely divided particles of flowable metallic joining material uniformly distributed through the said polymeric material, said metal particles being smaller than 65 screen mesh, applying flux to the said assembly, heating the said filament to a temperature sufficient to vaporize the said binder and to liquify the said metallic particles and thereafter cooling the assembly.

References Cited in the file of this patent

UNITED STATES PATENTS

| 2,493,372 | Williams | Nov. 8, 1946 |
| 2,593,943 | Wainer | Apr. 22, 1952 |
| 2,606,132 | Klinker | Aug. 5, 1952 |
| 2,631,952 | Williams | Mar. 17, 1953 |
| 2,674,554 | Snell | Apr. 6, 1954 |
| 2,690,408 | Pessel | Sept. 28, 1954 |
| 2,714,760 | Boam et al. | Aug. 9, 1955 |

FOREIGN PATENTS

| 121,130 | Australia | July 24, 1947 |